United States Patent
Gubbels et al.

(10) Patent No.: US 12,104,098 B2
(45) Date of Patent: Oct. 1, 2024

(54) SELF-SEALING TIRES

(71) Applicant: DOW SILICONES CORPORATION, Midland, MI (US)

(72) Inventors: Frederic Gubbels, Seneffe (BE); Gregory Chambard, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 285 days.

(21) Appl. No.: 17/767,889

(22) PCT Filed: Oct. 6, 2020

(86) PCT No.: PCT/US2020/054419
§ 371 (c)(1),
(2) Date: Apr. 9, 2022

(87) PCT Pub. No.: WO2021/071847
PCT Pub. Date: Apr. 15, 2021

(65) Prior Publication Data
US 2023/0106847 A1   Apr. 6, 2023

Related U.S. Application Data

(60) Provisional application No. 62/913,203, filed on Oct. 10, 2019.

(51) Int. Cl.
| | |
|---|---|
| *B60C 19/00* | (2006.01) |
| *B29C 73/16* | (2006.01) |
| *C08J 5/12* | (2006.01) |
| *C08J 9/36* | (2006.01) |
| *C09J 5/00* | (2006.01) |
| *C09J 11/04* | (2006.01) |
| *C09J 11/06* | (2006.01) |
| *C09J 183/06* | (2006.01) |

(52) U.S. Cl.
CPC ........... *C09J 183/06* (2013.01); *B29C 73/163* (2013.01); *B60C 19/002* (2013.01); *C08J 5/128* (2013.01); *C08J 9/36* (2013.01); *C09J 5/00* (2013.01); *C09J 11/04* (2013.01); *C09J 11/06* (2013.01); *C08J 2205/052* (2013.01); *C08J 2321/00* (2013.01); *C08J 2375/04* (2013.01); *C08J 2483/06* (2013.01); *C09J 2400/246* (2013.01); *C09J 2421/008* (2013.01); *C09J 2483/00* (2013.01)

(58) Field of Classification Search
CPC .... B60C 19/002; B29C 73/16; B29D 30/0685
See application file for complete search history.

(56) References Cited

U.S. PATENT DOCUMENTS

| | | |
|---|---|---|
| 4,087,585 A | 5/1978 | Schulz |
| 4,359,078 A | 11/1982 | Egan |
| 5,194,649 A | 3/1993 | Okawa |
| 5,733,996 A | 3/1998 | De Buyl et al. |
| 6,512,072 B1 | 1/2003 | Gantner et al. |
| 6,642,309 B2 | 11/2003 | Komitsu et al. |
| 7,144,953 B2 | 12/2006 | Ueda et al. |
| 7,417,105 B2 | 8/2008 | Landon et al. |
| 7,893,170 B2 | 2/2011 | Wakioka et al. |
| 7,973,108 B2 | 7/2011 | Okamoto et al. |
| 8,030,371 B2 | 10/2011 | Chaussade |
| 8,231,944 B1 | 7/2012 | Schroeder |
| 8,609,797 B2 | 12/2013 | Knepper et al. |
| 8,686,094 B2 | 4/2014 | Djurdjevic et al. |
| 8,785,537 B2 | 7/2014 | Carrard et al. |
| 8,801,890 B2 | 8/2014 | Verosky et al. |
| 9,493,689 B2 | 11/2016 | Stanjek et al. |
| 9,527,985 B2 | 12/2016 | Okamatsu |
| 9,677,025 B2 | 6/2017 | Voge et al. |
| 9,732,203 B2 | 8/2017 | Okamatsu |
| 9,802,446 B2 | 10/2017 | Dahlke et al. |
| 10,150,888 B2 | 12/2018 | Simon et al. |
| 10,414,907 B2 | 9/2019 | Takahara |
| 10,717,870 B1 | 7/2020 | Gubbels et al. |
| 2006/0247349 A1 | 11/2006 | Kollmann et al. |
| 2009/0277549 A1 | 11/2009 | Tanno |
| 2010/0119715 A1 | 5/2010 | Sostmann et al. |
| 2010/0307655 A1 | 12/2010 | Tanno |
| 2015/0007938 A1 | 1/2015 | Stanjek et al. |

(Continued)

FOREIGN PATENT DOCUMENTS

| | | |
|---|---|---|
| CN | 105849213 A | 8/2016 |
| CN | 107207860 A | 9/2017 |

(Continued)

OTHER PUBLICATIONS

International Search Report for PCT/US2020/054419 dated Dec. 21, 2020, 3 pages.

(Continued)

*Primary Examiner* — Cedrick S Williams

(74) *Attorney, Agent, or Firm* — Warner Norcross + Judd LLP

(57) ABSTRACT

The present disclosure relates to self-sealing tires, a process for making said self-sealing tires and the use of a silicone composition cured via a condensation cure chemistry to form a self-sealing layer designed to function as both (i) a self-sealing tire puncture material, i.e., to seal puncture holes in the tread region of tires if/when punctured by a foreign body and (ii) as an adhesive for sound-absorbing foams adapted to reduce the noise generated by tires during travel.

16 Claims, No Drawings

(56) References Cited

U.S. PATENT DOCUMENTS

| | | |
|---|---|---|
| 2015/0166859 A1 | 6/2015 | Choffat et al. |
| 2016/0001612 A1 | 1/2016 | Joo et al. |
| 2016/0009954 A1 | 1/2016 | Hanson |
| 2016/0340548 A1 | 11/2016 | Gubbels et al. |
| 2017/0015146 A1* | 1/2017 | Tyburski ............... B60C 19/002 |
| 2017/0297281 A1 | 10/2017 | Yukawa et al. |
| 2017/0348929 A1 | 12/2017 | Badaroux |
| 2018/0009951 A1 | 1/2018 | Gubbels et al. |
| 2018/0079263 A1 | 3/2018 | Tyburski et al. |
| 2018/0086158 A1 | 3/2018 | Bauer |
| 2018/0117974 A1 | 5/2018 | Jacob et al. |
| 2018/0126803 A1 | 5/2018 | Jacob et al. |
| 2019/0177486 A1* | 6/2019 | Baily ....................... C08K 5/57 |
| 2019/0177584 A1 | 6/2019 | Gubbels et al. |
| 2019/0338077 A1 | 11/2019 | Chambard et al. |
| 2020/0063009 A1 | 2/2020 | Detemmerman et al. |

FOREIGN PATENT DOCUMENTS

| | | | |
|---|---|---|---|
| CN | 108289827 A | 7/2018 | |
| CN | 109476919 A | 3/2019 | |
| CN | 109642078 A | 4/2019 | |
| EP | 2006125 A1 * | 12/2008 | ........... B60C 19/002 |
| EP | 2397314 A1 | 12/2011 | |
| EP | 2554617 A2 | 2/2013 | |
| EP | 2562009 A2 | 2/2013 | |
| EP | 3227128 B1 | 2/2018 | |
| WO | 2009013309 A1 | 1/2009 | |
| WO | 2013131330 A1 | 9/2013 | |
| WO | 2016060229 A1 | 4/2016 | |
| WO | 2016120270 A1 | 8/2016 | |
| WO | 2017001997 A1 | 1/2017 | |
| WO | 2017163219 A1 | 9/2017 | |
| WO | 2018024856 A1 | 2/2018 | |
| WO | 2018024857 A1 | 2/2018 | |
| WO | 2018024858 A1 | 2/2018 | |
| WO | 2018024859 A1 | 2/2018 | |
| WO | 2018024860 A1 | 2/2018 | |
| WO | 2018024861 A1 | 2/2018 | |
| WO | 2018024865 A1 | 2/2018 | |
| WO | 2018050503 A1 | 3/2018 | |
| WO | 2018200796 A1 | 11/2018 | |
| WO | 2019027668 A1 | 2/2019 | |

OTHER PUBLICATIONS

Noll, W., "Chemistry and Technology of Silicones", Academic Press Inc., New York, 1968, pp. 397-399.

Brook, Michael A., "Silicon in organic, organometallic and polymer chemistry", John Wiley & Sons, Inc. (2000), pp. 285-287.

M. Mikrut et al., "Silicone Rubber Tack I: Relation to Network Structure", The Journal of Adhesion, (2009), 85:7, pp. 395-412.

* cited by examiner

SELF-SEALING TIRES

CROSS-REFERENCE TO RELATED APPLICATIONS

This application is the U.S. National Stage of International Application No. PCT/US2020/054419 filed on 6 Oct. 2020, which claims priority to and all advantages of U.S. Provisional Application No. 62/913,203 filed on 10 Oct. 2019, the content of which is incorporated herein by reference.

TECHNICAL FIELD

The present disclosure relates to self-sealing tires, a process for making said self-sealing tires and the use of a silicone composition cured via a condensation cure chemistry to form a self-sealing layer designed to function as both (i) a self-sealing tire puncture material, i.e., to seal puncture holes in the tread region of tires if/when punctured by a foreign body and (ii) as an adhesive for sound-absorbing foams adapted to reduce the noise generated by tires during travel.

BACKGROUND

Pneumatic tires are widely used due to their excellent shock absorbing properties and ability to provide riding comfort in a vehicle. In use a pneumatic tire is mounted on a wheel rim. Once assembled, the inner surface of the tire and the wheel rim define an inner annular cavity intended to be inflated to support the load on the tire. During vehicle movement, e.g., rolling on a road surface, the tire is cyclically compressed in a tread crushing step causing air present in the inner annular cavity to vibrate, leading to the generation of sound waves/noise in the cavity, often referred to as "cavity noise". Such pneumatic tires are prone to puncture since they are inherently made of soft and flexible material including rubber. When a puncture occurs due to e.g., travelling over sharp foreign bodies such as nails, stones, glass fragments, unless prevented, the high-pressure air in the inner annular cavity leaks causing deflation, and the pneumatic tire cannot function properly. Historically, when a tire was punctured by a foreign body e.g., a nail, it was necessary to replace the original tire with a spare. However, in recent years tire manufacturers have sought to provide alternative solutions for the driver, such as the provision of self-sealing tires to allow a vehicle to continue to travel despite a considerable or complete loss of pressure in one or more tires. This makes it possible, for example, to drive to a breakdown point without having to stop, often in hazardous circumstances, to fit a spare tire.

Self-sealing pneumatic tires are designed with a view to providing a sealant/adhesive layer, which may be made from a silicone elastomer, on the inner surface of the tire, especially the inner surface of the tire tread so that when such a tire runs over a nail or the like and is punctured, the self-sealing sealant/adhesive layer on the inner surface of the tire seals the resulting hole by causing a portion of the sealant/adhesive layer in the self-sealing tire to be drawn or flow into the resulting puncture hole after the nail falls out due to centrifugal force to form a seal.

Problems persist with the materials used to seal punctured self-sealing tires. These include lack of stability over time, lack of effectiveness under extreme operating temperature conditions and/or difficulties in manufacturing.

Vehicle manufacturers are also continuously seeking to improve the driving experience for a driver and their passenger(s). Currently one aspect of attention is the reduction of noise. As the automotive industry moves towards the production of quieter vehicles, the tire cavity noise is becoming an increasingly significant issue for vehicle occupants as it is transmitted to the passenger compartment of the vehicle. It has been determined that the volume of such cavity noise may be reduced by the introduction of sound-absorbing materials in the inner cavity of the tire.

The currently preferred sound-absorbing materials used for such matters are suitable foams utilised as one or more internal sound-absorbing layer(s) fixed in the inner cavity of the tire.

During use, the sound-absorbing materials inserted in the inner cavity of tires are subject to the very significant mechanical and thermal stresses discussed above, for example, during the usual movement of a tire when a vehicle is in motion, the sound-absorbing materials, e.g., foams, are constantly stretched by deformation of the tire as well as being heated well above ambient temperature, due to the heat generated by the tread when in contact with the road surface. Therefore, both the sound-absorbing materials and adhesives used to adhere them to a tire surface are required to exhibit suitable thermal and mechanical properties so as not to become degraded and/or deformed due to the combined action of heat and stress.

An object of the present invention is to provide a pneumatic tire that has both superior puncture seal performance and sound-absorbing or even prevention performance.

SUMMARY

In a first embodiment there is provided a self-sealing pneumatic tire comprising:
an outer surface; having a profiled tread and an inner surface;
a self-sealing silicone layer applied on said inner surface of the tire;
a sound-absorbing layer adhesively attached to said inner surface of the tire by way of said self-sealing silicone layer; wherein said self-sealing silicone layer is applied before said sound-absorbing layer is adhered thereto;
wherein said self-sealing silicone layer is cured from a silicone self-sealing composition comprising
(i) at least one condensation curable silyl terminated polymer having at least two hydroxyl functional groups per molecule;
(ii) a cross-linker selected from the group of
silanes having at least two hydrolysable groups, alternatively at least three hydrolysable groups per molecule group; and/or
silyl functional molecules having at least two silyl groups, each silyl group containing at least two hydrolysable groups, alternatively at least three hydrolysable groups,
(iii) a condensation catalyst selected from the group of titanates and/or zirconates; and
(iv) reinforcing and/or non-reinforcing filler
wherein (iii) and (iv) are not stored together prior to use, characterized in that
the molar ratio of total silicon bonded-hydroxyl groups to total hydrolysable groups is between 0.5: 1 and 2:1 using a silane containing cross linker or 0.5:1 to 10:1, using silyl functional molecules containing crosslinker; and the molar ratio of catalyst M-OR functions, where M is titanium or zirconium and R is an alkyl group or chelate group, to the sum of moisture present in the filler, as determined in accordance with ISO 787-2:1981, and total silicon bonded hydroxyl groups is between 0.01:1 and 0.6:1.

There is also provided a process for preparing a self-sealing pneumatic tire comprising the steps of:
(a) providing a pneumatic tire comprising an outer surface having a profiled tread and an inner surface;
(b) applying a silicone self-sealing composition on the inner surface of the tire to form a self-sealing silicone layer;
(c) applying a sound-absorbing layer to said inner surface of the tire by adhesion to the self-sealing silicone layer;
wherein said self-sealing silicone layer is cured from a silicone self-sealing composition comprising
(i) at least one condensation curable silyl terminated polymer having at least one, typically at least two hydroxyl functional groups per molecule;
(ii) a cross-linker selected from the group of
silanes having at least two hydrolysable groups, alternatively at least three hydrolysable groups per molecule group; and/or
silyl functional molecules having at least two silyl groups, each silyl group containing at least two hydrolysable groups, alternatively at least three hydrolysable groups,
(iii) a condensation catalyst selected from the group of titanates and/or zirconates; and
(iv) reinforcing and/or non-reinforcing filler
wherein (iii) and (iv) are not stored together prior to use, characterized in that the molar ratio of total silicon bonded-hydroxyl groups to total hydrolysable groups is between 0.5: 1 and 2:1 using a silane containing cross linker or 0.5:1 to 10:1, using silyl functional molecules containing crosslinker and the molar ratio of catalyst M-OR functions where M is titanium or zirconium and R is an alkyl group, to the sum of moisture present in the filler, as determined in accordance with ISO 787-2:1981, and total silicon bonded hydroxyl groups is between 0.01:1 and 0.6:1.

There is additionally provided the use of a self-sealing silicone composition comprising
(i) at least one condensation curable silyl terminated polymer having at least one, typically at least two hydroxyl functional groups per molecule;
(ii) a cross-linker selected from the group of
silanes having at least two hydrolysable groups, alternatively at least three hydrolysable groups per molecule group; and/or
silyl functional molecules having at least two silyl groups, each silyl group containing at least two hydrolysable groups, alternatively at least three hydrolysable groups,
(iii) a condensation catalyst selected from the group of titanates and/or zirconates; and
(iv) reinforcing and/or non-reinforcing filler
wherein (iii) and (iv) are not stored together prior to use, characterized in that the molar ratio of total silicon bonded-hydroxyl groups to total hydrolysable groups is between 0.5: 1 and 2:1 using a silane containing cross linker or 0.5:1 to 10:1, using silyl functional molecules containing crosslinker and the molar ratio of catalyst M-OR functions where M is titanium or zirconium and R is an alkyl group, to the sum of moisture present in the filler, as determined in accordance with ISO 787-2:1981, and total silicon bonded hydroxyl groups is between 0.01:1 and 0.6:1;

in a self-sealing tire comprising an outer surface having a profiled tread and an inner surface both as a self-sealing layer on the inner surface of said tire and as an adhesive to adhere a sound-absorbing layer to said inner surface of the pneumatic tire.

The self-sealing pneumatic tire as described above is designed to have a cured self-sealing layer which can delay or prevent the escape of air and consequent deflation of the tire due to a puncture caused by a sharp object such as a nail. Moreover, the self-sealing layer is suitable to additionally function as an adhesive for a sound-absorbing layer such as a foam layer provided to reduce the noise perceived in the passenger compartment of vehicles, due to the attenuation of the cavity noise of the tire itself.

DETAILED DESCRIPTION

It is to be understood that for the sake of this application that "total hydrolysable groups" excludes both moisture (i.e., water) derived from fillers used, and silicon bonded hydroxyl (silanol/Si—OH) groups present in the composition.

The total silicon bonded hydroxyl (silanol/Si—OH) molar content is calculated for 100 g of the mixed formulation. The total silicon bonded hydroxyl molar content related to a polymer is equal to the amount in grams (g) of hydroxyl containing polymer in 100 g of the mixed product divided by the number average molecular weight (Mn) of the polymer multiplied by the average number of hydroxyl functions present in the polymer, typically 2. If there are several hydroxyl functional polymers in the formulation, the sum of the molar content of each polymer is added up to constitute the total silicon bonded hydroxyl (Si—OH) molar content in the formulation.

The total hydrolysable groups molar content is calculated for 100 g of the mixed formulation. The molar content of hydrolysable groups related to a substance is equal to the amount in g of the molecule that contains the hydrolysable groups in 100 g of the mixed product divided by the molecular weight of the molecule or the number average molecular weight (Mn) in case it is a polymeric molecule multiplied by the average number of hydrolysable functions present in the molecule. The sum of the molar content of each molecule or polymer is added up to constitute the total molar content of hydrolysable groups in the formulation.

The molar ratio of total silicon bonded hydroxyl groups to total hydrolysable groups is then calculated by dividing the total molar content of total silicon bonded hydroxyl (Si—OH) groups by the total molar content of hydrolysable groups or can be depicted as a ratio.

The number average molecular weight (Mn) and weight average molecular weight (Mw) of silicone can also be determined by Gel permeation chromatography (GPC). This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer.

The catalyst M-OR value is =[(g of Titanate catalyst)* (number of OR in compound)] divided by the (molecular weight of Titanium catalyst).

The molar ratio of total silicon bonded hydroxyl groups to total hydrolysable groups is between 0.4: 1 and 2:1 using a mono silyl containing cross linker or 0.5:1 to 10:1 using disilyl containing crosslinker. In an alternative embodiment the molar ratio of total silicon bonded hydroxyl groups to total hydrolysable groups is >2:1 using disilyl containing crosslinker.

The silicone composition has a viscosity, when uncured, that permits the silicone composition to be incorporated into a tire during a tire building process and a viscosity that, when cured, permits the material to flow into and seal a puncture in a tire. Generally the composition is cured/curable at room temperature.

Once cured, the self-sealing silicone sealant composition described above has been found to provide a self-sealing function over a very wide range of operating temperatures during the entire lifetime of the tire. It is sufficiently adherent to a puncturing object, which henceforth we will refer to as a "nail", to close off holes created by a nail which remains in place. Furthermore, when the nail is removed the self-sealing silicone layer as hereinbefore described can seal the hole and make the tire airtight, even under low-temperature conditions, i.e., in winter because it has suitable physical properties, namely tensile strength, elongation and cross-link density or the storage modulus pertinent for the function of a self-sealing silicone layer.

Tensile strength refers to the maximum stress (force per unit area) that a specimen of sealant material can withstand before rupturing. Elongation measures the relative increase in length of a specimen of material at the point of rupture. Cross-link density is a molecular property which measures the concentration of cross-links present in that part of the sealant which has been cured into a three-dimensional cross-linked network. The storage modulus of a material is related to the cross-link density of the material. A high crosslink density will lead to a higher storage modulus and conversely a low crosslinked material will exhibit a low storage modulus.

However, it has now additionally been found that the silicone self-sealing composition as described above can be utilised in the aforementioned pneumatic tire as both a self-sealing silicone layer and also as an adhesive for a sound-absorbing layer to be adhered to the inner surface of a pneumatic tire.

Polymer (i) is at least one moisture/condensation curable polymer having silanol containing terminal groups. Any suitable moisture/condensation curable polymer having silanol containing terminal groups may be utilised including polydialkyl siloxanes, alkylphenyl siloxane, or organic based polymers with silyl terminal groups e.g., silyl polyethers, silyl acrylates and silyl terminated polyisobutylenes or copolymers of any of the above. Preferably the polymer is a polysiloxane based polymer containing at least one hydroxyl, most preferably the polymer comprises two terminal hydroxyl groups. Examples of suitable silanol containing terminal groups include —Si(OH)$_3$, —(R$^a$)Si(OH)$_2$, —(R$^a$)$_2$Si(OH), or —(R$^a$)$_2$Si—R$^c$—SiR$^d_p$(OH)$_{3-p}$ where each R$^a$ independently represents a monovalent hydrocarbon group, for example, an alkyl group, in particular having from 1 to 8 carbon atoms, (and is preferably methyl); each R$^d$ group is independently an alkyl group in which the alkyl groups suitably have up to 6 carbon atoms; R$^c$ is a divalent hydrocarbon group having up to 12 carbon atoms, such as ethylene or propylene, which may be interrupted by one or more siloxane spacers having up to six silicon atoms; and p has the value 0, 1 or 2.

Preferably polymer (i) has the general formula $$X^3\text{-A-}X^1 \tag{1}$$

where $X^3$ and $X^1$ are independently selected from siloxane groups which terminate in hydroxyl containing groups and A is a siloxane and/or organic containing polymeric chain, alternatively a siloxane polymeric chain.

Examples of silanol containing terminating groups $X^3$ or $X^1$ include —Si(OH)$_3$, —(R$^a$)Si(OH)$_2$, —(R$^a$)$_2$Si(OH), or —(R$^a$)$_2$Si—R$^c$—Si (R$^d$)$_p$(OH)$_{3-p}$ as defined above. Preferably the $X^3$ and/or $X^1$ terminal groups are hydroxydialkyl terminated, e.g., hydroxydimethyl terminated.

Examples of suitable siloxane groups in polymeric chain A of formula (I) are those which comprise a polydiorganosiloxane chain. Thus, polymeric chain A preferably includes siloxane units of formula (2)

$$-(R^5_s SiO_{(4-s)/2})- \tag{2}$$

in which each $R^5$ is independently an organic group such as a hydrocarbyl group having from 1 to 10 carbon atoms optionally substituted with one or more halogen group such as chlorine or fluorine and s is 0, 1 or 2, typically the average value of s is about 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all the groups $R^5$ are methyl.

Typically the polymers of the above type will have a viscosity in the order of 1,000 to 300,000 mPa·s, alternatively 1,000 to 250,000 mPa·s at 23° C. measured by using a Brookfield cone plate viscometer (RV DIII) using the most appropriate cone plate for the viscosity concerned. In one embodiment the polymers of the above type have a viscosity of from 30,000 to 200,000 mPa·s, alternatively 45,000 to 175,000 mPa·s at 23° C., alternatively from 50,000 to 150,000 mPa·s at 23° C. measured by using a Brookfield cone plate viscometer (RV DIII) using the most appropriate spindle for the viscosity concerned, e.g., a CP-51 or CP-52 spindle at from 0.1 to 5 rpm.

Preferred polysiloxanes containing units of formula (2) are thus polydiorganosiloxanes having silanol (Si—OH) containing terminal groups. The polydiorganosiloxanes may be homopolymers or copolymers.

Furthermore, the composition may contain polymers having one Si-hydroxyl (silanol) containing terminal group for example one —Si(OH)$_3$, —(R$^a$)Si(OH)$_2$, —(R$^a$)$_2$Si(OH), or —(R$^a$)$_2$Si—R$^c$—SiR$^d_p$(OH)$_{3-p}$ as defined above, e.g., a dialkylhydroxy terminated group and one unreactive terminal group e.g., a trialkyl terminated, i.e., trimethyl terminated group. Hence, polymer (i) may additionally comprise polydiorganosiloxanes which are partially dialkylhydroxy terminated and partially trialkyl terminated. The inclusion of such additional polymers can reduce modulus of elasticity of the resulting product after cure and/or improve adhesion to hard-to-adhere substrates. Such additional polymers (i) may be of an analogous viscosity to those previously described.

In accordance with the present invention polymeric chain A may alternatively be organic based polymers with silyl terminal groups e.g., silyl terminated polyethers, silyl terminated acrylates and silyl terminated polyisobutylenes. In the case of silyl terminated polyethers the polymer chain is based on polyoxyalkylene based units. Such polyoxyalkylene units preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$ wherein n is an integer from 2 to 4 inclusive and y is an integer of at least four. The number average molecular weight of each polyoxyalkylene polymer block or polymer may range from about 300 g/mol to about 10,000 g/mol. but can be higher. Moreover, the oxyalkylene units are not necessarily identical throughout the polyoxyalkylene monomer but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof.

Other polyoxyalkylene units may include for example: units of the structure

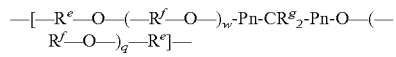
—[—$R^e$—O—(—$R^f$—O—)$_w$-Pn-$CR^g{}_2$-Pn-O—(—$R^f$—O—)$_q$—$R^e$]— in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts w and q is a positive integer in the range from 3 to 30.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Crosslinkers (ii) that can be used are generally selected from
silanes having at least two hydrolysable groups or alternatively at least three hydrolysable groups per molecule group; and/or
silyl functional molecules having at least two silyl groups, each silyl group containing at least two hydrolysable groups, alternatively at least three hydrolysable groups.

In some instances, the silane type crosslinker (ii) having two hydrolysable groups may be considered a chain extender, i.e., when polymer (i) only has 1 or two reactive groups, but can be used to cross-link if polymer (i) has 3 or more reactive groups per molecule. The crosslinker (ii) may thus have two but alternatively has three or four silicon-bonded condensable (preferably hydroxyl and/or hydrolysable) groups per molecule which are reactive with the condensable groups in polymer (i).

For the sake of the disclosure herein silyl functional molecule is a silyl functional molecule containing two or more silyl groups, each silyl group containing at least two hydrolysable groups, alternatively at least three hydrolysable groups. Hence, a disilyl functional molecule comprises two silicon atoms each having at least one hydrolysable group, where the silicon atoms are separated by an organic or siloxane polymeric backbone. Typically, the silyl groups on a disilyl functional molecule may be terminal groups.

For the sake of the disclosure herein a disilane is a silyl functional molecule having at least two silyl groups where the two silicon atoms are bonded to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy).

The silane cross-linker (ii) includes alkoxy functional silanes, oximosilanes, acetoxy silanes, acetonoxime silanes and/or enoxy silanes.

When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical silane may be described by formula (3)

$$R''_{4-r}Si(OR^5)_r \quad (3)$$

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acetoxy, oxime. In some instances, $R^5$ represents methyl or ethyl and r is 3.

Another type of suitable crosslinker (ii) are molecules of the type $Si(OR^5)_4$ where $R^5$ is as described above, alternatively propyl, ethyl or methyl. Partial condensates of $Si(OR^5)_4$ may also be considered.

In one embodiment the cross-linker (ii) is a silyl functional molecule having at least two silyl groups each having each silyl group has at least two hydrolysable groups. Cross-linker (ii) may additionally comprise silyl functional molecules having at least two silyl groups in which some or all of the silyl groups contain only one hydrolysable group.

The silyl (e.g., disilyl) functional crosslinker (ii) may have a siloxane or organic polymeric backbone. Suitable polymeric crosslinkers (ii) may have a similar polymeric backbone chemical structure to polymeric chain A as depicted in formula (1) above. In the case of such siloxane or organic based cross-linkers the molecular structure can be straight chained, branched, cyclic or macromolecular, i.e., a silicone or organic polymer chain bearing alkoxy functional end groups include polydimethylsiloxanes having at least one trialkoxy terminal where the alkoxy group may be a methoxy or ethoxy group.

In the case of siloxane-based polymers the viscosity of the cross-linker will be within the range of from 0.5 mPa·s to 80,000 mPa·s at 23° C. using a Brookfield cone plate viscometer (RV DIII) utilising a cone plate (measured in the same manner as polymer (i)). Whilst any of the hydrolysable groups mentioned above are suitable it is preferred that the hydrolysable groups are alkoxy groups and as such the terminal silyl groups may have the formula such as —$R^aSi(OR^b)_2$, —$Si(OR^b)_3$, —$R^a{}_2SiOR^b$ or —$(R^a)_2Si$—$R^c$—$SiR^d{}_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl group having up to 6 carbon atoms; $R^c$ is a divalent hydrocarbon group which may be interrupted by one or more siloxane spacers having up to six silicon atoms; and p has the value 0, 1 or 2. Typically each terminal silyl group will have 2 or 3 alkoxy groups.

The crosslinker (ii) may be a disilyl functional polymer, that is, a polymer containing two silyl groups, each containing at least two hydrolysable groups, alternatively at least three hydrolysable groups such as described by the formula (4)

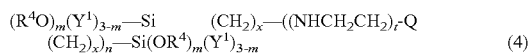

(4)

where $R^4$ is a $C_{1-10}$ alkyl group, $Y^1$ is an alkyl groups containing from 1 to 8 carbons, Q is a chemical group containing a heteroatom with a lone pair of electrons e.g., an amine, N-alkylamine or urea; each x is an integer of from 1 to 6, t is 0 or 1; each m is independently 2 or 3 and n is 0 or 1.

Examples of disilyl polymeric crosslinkers (ii) with a silicone or organic polymer chain bearing alkoxy functional end groups include 1,6-bis (trimethoxysilyl)hexane (alternatively known as hexamethoxydisilylhexane HMSH), polydimethylsiloxanes having at least one trialkoxy terminal where the alkoxy group may be a methoxy or ethoxy group.

Crosslinkers (ii) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyltris-methylethylketoximo)silane, methyltris(methylethyleketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; bis (trialkoxysilylalkyl)amines, bis (dialkoxyalkylsilylalkyl)amine, bis (trialkoxysilylalkyl) N-alkylamine, bis (dialkoxyalkylsilylalkyl) N-alkylamine, bis (trialkoxysilylalkyl)urea, bis (dialkoxyalkylsilylalkyl) urea, bis (3-trimethoxysilylpropyl)amine, bis (3-triethoxysilylpropyl)amine, bis (4-trimethoxysilylbutyeamine, bis (4-triethoxysilylbutyl)amine, bis (3-trimethoxysilylpropyl)N-methylamine, bis (3-triethoxysilylpropyl) N-methylamine, bis (4-trimethoxysilylbutyl) N-methylamine, bis (4-triethoxysilylbutyl) N-methylamine, bis (3-trimethoxysilylpropyl) urea, bis (3-triethoxysilylpropyl)urea, bis (4-trimethoxysilylbutyl)urea, bis (4-triethoxysilylbutyl)urea, bis (3-dimethoxymethylsilylpropyl)amine, bis (3-diethoxymethyl silylpropyl)amine, bis (4-dimethoxymethylsilylbutyl) amine, bis (4-diethoxymethyl silylbutyl)amine, bis (3-dimethoxymethylsilylpropyl) N-methylamine, bis (3-diethoxymethyl silylpropyl) N-methylamine, bis (4-dimethoxymethylsilylbutyl) N-methylamine, bis (4-diethoxymethyl silylbutyl) N-methylamine, bis (3-dimethoxymethylsilylpropyl)urea, bis (3-diethoxymethyl silylpropyl)urea, bis (4-dimethoxymethylsilylbutyl)urea, bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine, bis (4-diethoxyethyl silylbutyl)amine, bis (3-dimethoxyethylsilylpropyl) N-methylamine, bis (3-diethoxyethyl silylpropyl) N-methylamine, bis (4-dimethoxyethylsilylbutyl) N-methylamine, bis (4-diethoxyethyl silylbutyl) N-methylamine, bis (3-dimethoxyethylsilylpropyl)urea bis (3-diethoxyethyl silylpropyl)urea, bis (4-dimethoxyethylsilylbutyl)urea and/or bis (4-diethoxyethyl silylbutyl)urea; bis (triethoxysilylpropyl) amine, bis (trimethoxysilylpropyl)amine, bis (trimethoxysilylpropyl)urea, bis (triethoxysilylpropyl)urea, bis (diethoxymethylsilylpropyl)N-methylamine; di or trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; di or triacetoxy silyl terminated polydialkyl; polyarylalkyl siloxane; di or trioximino silyl terminated polydialkyl; polyarylalkyl siloxane; di or triacetonoxy terminated polydialkyl or polyarylalkyl. The crosslinker (ii) used may also comprise any combination of two or more of the above.

The composition further comprises a titanate or zirconate condensation catalyst. This increases the speed at which the composition cures. The catalyst chosen for inclusion in a particular silicone sealant composition depends upon the speed of cure required. By titanate or zirconate is meant a titanium atom or zirconium atom having up to four organic groups, typically alkyl groups or chelates bound thereto via oxygen, i.e., M-OR, where M is titanium or zirconium. In most instances R is an alkyl group containing up to ten carbons or a chelate as discussed below.

Titanate and/or zirconate based catalysts may comprise a compound according to the general formula $Ti[OR^{22}]_4$ or $Zr[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of $R^{22}$ include but are not restricted to methyl, ethyl, propyl, isopropyl, butyl, tertiary butyl and a branched secondary alkyl group such as 2,4-dimethyl-3-pentyl. Alternatively, when each $R^{22}$ is the same, $R^{22}$ is an isopropyl, branched secondary alkyl group or a tertiary alkyl group, in particular, tertiary butyl. Suitable titanate examples include tetra n-butyl titanate, tetra t-butyl titanate, titanium tetrabutoxide and tetraisopropyl titanate. Suitable zirconate examples include tetra-n-propyl zirconate, tetra-n-butyl zirconate and zirconium diethyl citrate.

Alternatively, the titanate and/or zirconate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate or diisopropyldiethylacetoacetate titanate.

The molar ratio of catalyst M-OR functions to the sum of moisture present in the filler present in the composition, as determined in accordance with ISO 787-2:1981 and total silicon bonded hydroxyl groups is between 0.01:1 and 0.6:1, where M is titanium or zirconium. In one embodiment R is $R^{22}$ as defined above.

Fillers

The silicone self-sealing composition includes reinforcing and non-reinforcing fillers (iv), or a combination thereof.

Examples of finely divided, reinforcing fillers include high surface area fumed and precipitated silicas including rice hull ash and to a degree calcium carbonate. Examples of additional finely divided non-reinforcing fillers include crushed quartz, diatomaceous earths, barium sulphate, iron oxide, titanium dioxide, carbon black, glass beads, hollow glass beads, talc, wollastonite. Other fillers which might be used alone or in addition to the above include carbon nanotubes, e.g., multiwall carbon nanotubes, carbon fibres, aluminite, calcium sulphate (anhydrite), gypsum, calcium sulphate, barium titanate, magnesium carbonate, clays such as kaolin, aluminium trihydroxide, magnesium hydroxide (brucite), graphite, diamond, copper carbonate, e.g., malachite, nickel carbonate, e.g., zarachite, barium carbonate, e.g., witherite and/or strontium carbonate e.g., strontianite. Examples of anhydrous inorganic fillers include onyx; aluminium trihydrate, metal oxides such as aluminium oxide, beryllium oxide, magnesium oxide, zinc oxide; nitrides such as aluminium nitride and boron nitride; carbides such as silicon carbide and tungsten carbide; and combinations thereof.

Further examples of fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$ The chain silicates group comprises ground silicate minerals, such as but not limited to, wollastonite and $Ca[SiO_3]$. The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

Any combination of two or more of the above fillers may be used.

When present in a preferred embodiment the fillers utilised are selected from fumed and precipitated silicas, calcium carbonate, carbon black, hollow glass beads and/or carbon nanotubes, e.g., multiwall carbon nanotubes, and mixtures thereof.

Unless anhydrous, the filler(s) utilised provide the body of the composition with moisture (water) contained in the filler. The quantitative amount of moisture (water) present in the filler may be determined by the extraction of moisture (water) from samples of the filler used in our compositions. using the test method of ISO787 2:1981.

Filler Treating Agent

The reinforcing and/or extending filler may optionally be surface treated with a treating agent. Treating agents and treating methods are known in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally, the surface treatment renders the filler(s) hydrophobic and therefore easier to handle and obtain a homogeneous mixture with the other components in the composition. Silanes such as

wherein $R^7$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, with the alkyl groups of 6 to 20 carbon atoms being preferred., $R^6$ is an alkyl group of 1 to 6 carbon atoms, and letter e is equal to 1, 2 or 3 may also be utilised as the treating agent for fillers.

Other than the above components optional components may be blended in the composition within a range such that the object of the present invention is achieved.

Examples of optional components include heat resistance-imparting agents, cold resistance-imparting agents, flame retarders, thixotropy-imparting agents, pigments, surfactants, flux agents, acid acceptors, protection agents, UV stabilizers, antioxidants, antiozonants, anti-corrosion additives, dyes and any suitable combination thereof.

Adhesion Promoter

Suitable adhesion promoters may comprise alkoxysilanes of the formula $R^{14}{}_h Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminium chelate or zirconium chelate. Examples of adhesion promoters may be found in U.S. Pat. Nos. 4,087,585 and 5,194,649. The curable composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Surfactants

Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05 wt. % of the surfactant based on the weight of the composition.

Flux Agent

The composition may comprise up to 2 wt. % of a flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

Acid Acceptor

Suitable acid acceptors include magnesium oxide, calcium oxide, and combinations thereof. The composition may comprise up to 2 wt. % of acid acceptor based on the weight of the composition, if appropriate.

Anti corrosion additives, such as nitrogen/sulphur containing heterocyclic compounds containing a triazole structure, a thiadiazole structure, a benzotriazole structure, a mercaptothiozole structure, a mercaptobenzothiazole structure or a benzimidazole structure.

In one embodiment the self-sealing silicone layer of said self-sealing pneumatic tire is made from a composition comprising (i) an organopolysiloxane based polymer having not less than two silicon-bonded hydroxyl or hydrolysable groups per molecule and a viscosity of from 30,000 mPa·s to 200,000 mPa·s at 23° C. in an amount of from 60 wt. % to 90 wt. % of the composition, alternatively from 70 wt. % to 90 wt. of the composition;

(ii) a cross-linker comprising a silyl functional polymer having at least two silyl groups, each silyl group containing at least two hydrolysable groups in an amount of from 1.0 wt. % to 10.0 wt. %, alternatively from 1 wt. % to 7.5 wt. % of the composition;

(iii) a condensation catalyst selected from the group of titanates and/or zirconates in an amount of from 0.01 wt. % to 5.0 wt. %, alternatively 0.05 wt. % to 3.0 wt. % of the composition; and (iv) a reinforcing or non-reinforcing filler; in an amount of from in an amount of from 10 wt. % to 40 wt. %, alternatively 10 wt. % to 25 wt. %, alternatively 10 wt. % to 20 wt. % of the composition of the composition; wherein the total weight % of the composition is 100wt. %.

The silicone self-sealing composition as hereinbefore described is typically stored in a multiple, usually two-part manner prior to use. In the case of two-part compositions, the two-part compositions may be mixed using any appropriate standard two-part mixing equipment with a dynamic or static mixer and is optionally dispensed therefrom for use in the application for which it is intended.

In one embodiment, the silicone self-sealing composition is stored in two-parts where said parts may be divided as follows a) polymer(i) and cross-linker (ii) in one part and polymer (i) and catalyst (iii) in the other part;

b) cross-linker (ii) in one part and polymer (i) and catalyst (iii) in the other part or c) when more than one polymer (i) is being utilised a first polymer(i) and cross-linker (ii) in one part and a second polymer (i) and catalyst (iii) in the other part;

d) polymer (i) in one part and the cross-linker (ii) and catalyst (iii) in the other part.

In each case the filler (iv) and catalyst (iii) are not in the same part. Preferably, filler (iv)is mixed with polymer (i) in a base part which may also contain other additives.

The two-parts can be mixed in any suitable ratio, e.g., base part: catalyst package for example from 15:1 to 1:1, alternatively 10:1 to 1:1.

In one embodiment, the silicone self-sealing composition, when cured may have an absolute tackiness of greater than (>)1, alternatively greater than or equal to (>) 1.025 wherein:

$$\text{Absolute Tackiness} = -[\text{tackiness strength}(F-)]/[\text{hardness strength }(F+)] \text{ or } = -[F-]/[F+]$$

Absolute tackiness is a measure of the ratio between the tackiness strength (F−) and the hardness strength (F+) determined using a suitable texture analyzer, in which the texture analyzer used in the examples herein was a Stable Micro Systems TA XT+ with a ½ inch (1.27 cm) hemisphere probe made of polyester set to penetrate a sample 5 mm at a speed of 0.1 mm/s. The hardness strength (F+) is the maximum "strength" measured during penetration of the probe and the tackiness strength (F−) and is the maximum "strength" measured during removal of the probe. Tackiness of a material is influenced by time and pressure of the contact body. A higher time or a higher pressure will result in a higher tackiness. Both time and surface area are constant during our measurement, but the force applied and therefore pressure applied will depends on the hardness of the sample. When tested a harder material will apply a higher pressure on the measuring probe, which may potentially "artificially" increase the measured strength (F−) when the probe is removed from the sample. In order to consider this impact of the hardness, we define the absolute tackiness as the ratio between tackiness strength (F−) and the hardness strength (F+). In view of this the measurement of absolute tackiness using the formula provided above is relied upon. A cured material having an absolute tackiness value of greater than 1, alternatively >1.025 is characteristic of a material that exhibits a higher tackiness strength [F−] than the hardness strength [F+] and it was found that this is best achieved with the product of the composition described above with a polymer (i) having a viscosity in the range of from 30,000 mPa·s to 200,000 mPa·s at 23° C., alternatively 45,000 to 175,000 mPa·s at 23° C., alternatively from 50,000 to 150,000 mPa·s at 23° C. measured by using a Brookfield cone plate viscometer (RV DIII) using the most appropriate spindle for the viscosity concerned, e.g., a CP-51 or CP-52 spindle at from 0.1 to 5 rpm.

As previously indicated there is also provided a process for preparing a self-sealing pneumatic tire comprising the steps of:

(a) providing a pneumatic tire comprising an outer surface having a profiled tread and an inner surface;

(b) applying a silicone self-sealing composition on the inner surface of the tire to form a self-sealing silicone layer;

(c) applying a sound-absorbing layer, typically a sound-absorbing foam layer, to said inner surface of the tire by adhesion to the layer of self-sealing silicone sealant composition;

wherein said self-sealing silicone layer is cured from a silicone self-sealing composition as hereinbefore described.

Steps (b) the application of the silicone layer and (c) the application of the sound-absorbing layer e.g., sound-absorbing foam layer may be achieved in any suitable manner In order for a sealant to be practical as a self-sealing silicone layer for a tire, it must also be formulated so that it can be easily and practically applied to the tire or article on which it is to be used. One method of applying sealant to the interior of a tire includes the steps of mixing the sealant composition with a curing agent and spraying it into the tire interior as the tire is rotated. Some curing of the sealant occurs as the tire is rotated due to the mixing of the two-parts of the composition, resulting in a uniform, seamless coating which resists running and pooling.

The silicone self-sealing composition as herein described is typically suited for application onto a post-vulcanised tire as no heat is required for curing.

In the present invention the silicone self-sealing composition is provided as a two-part composition. The two-part composition is mixed in a suitable mixing/dosing unit and the mixed composition is immediately applied onto the target substrate (tire) surface. Post mixing the composition is designed to have sufficient green strength to adhere to the tire inner surface and will cure after several hours.

Typically the two-part silicone self-sealing composition is applied in an uncured state and cures upon mixing and deposition on the substrate tire surface so as to have a cured thickness of between 0.25 and 10 mm, alternatively between 0.5 mm and 10 mm, alternatively between 1 and 5 mm, depending on the end use as discussed below. Subsequent to intermixing but prior to cure the condensation curable gel composition may be applied on to a substrate using a suitable dispenser such as for example curtain coaters, spray devices die coaters, dip coaters, extrusion coaters, knife coaters and screen coaters which upon cure formation is provides a coating on said substrate.

The thickness and pressure requirements required will vary depending on the end use of the tire concerned. Thus, for example, for tires of passenger vehicle type, it can have a thickness of at least 0.5 mm, preferably between 1 and 5 mm According to another example, for tires for heavy duty or agricultural vehicles, the preferred thickness can lie between 1 and 6 mm According to another example, for tires for vehicles in the field of earthmoving equipment or for aircraft, the preferred thickness can lie between 2 and 10 mm Finally, according to another example, for bicycle tires, the preferred thickness can lie between 0.4 and 2 mm.

In one embodiment the layer of silicone self-sealing composition may be cured on the inner surface of the tire before the sound-absorbing layer is applied. This is possible when the silicone self-sealing composition has an absolute tackiness of >1.025.

The self-sealing silicone layer derived from the two-part silicone self-sealing composition described above is a tacky solid (at 23° C.) and is characterized in particular, thanks to its specific formulation, by a very high flexibility and deformability. One advantage of use of the composition as described herein is that the cured layer has the advantage of exhibiting, within a very wide range of operating temperatures for the tires, virtually no disadvantage in terms of rolling resistance in comparison with a tire not comprising a self-sealing silicone layer. In comparison with non-silicone self-sealing compositions, the risks of excessive creep during use at relatively high temperature (typically greater than 60° C.), a temperature frequently encountered during the use of some tires, are notably reduced as silicone-based materials are more resistant to extreme temperature changes than many organic alternatives. Its self-sealing properties are also improved during use at low temperature (typically less than 0° C.).

Furthermore, the cured self-sealing silicone layer derived from the aforementioned composition has a storage modulus of between 9,000 and 26,000 Pa. A storage modulus comprised between these two values has been identified to provide the right balance between softness (tackiness to the nail or itself) and hardness (creep/flow resistance under pressure). A silicone formulation exhibiting such a storage modulus at 23° C. will exhibit a storage modulus at other temperatures, i.e., from −25 to 100° C., which still is compliant with the required balance of modulus to act as a self-sealing coating for tires.

The sound-absorbing layer applied in step (c) may comprise any suitable sound-absorbing material but is preferably a sound-absorbing foam. When a foam it may be any suitable foam effective at damping the noise generated in the inner annular cavity due to the rolling thereof in use. The foam may be for example either a closed cell foam or an open cell foam or a combination of both and may or may not be viscoelastic. The foam may be for example a suitable polyurethane foam, a polyester foam, a polyolefin foam, a silicone foam and/or a polyether foam.

Any suitable means of applying and adhering the foam to the previously applied silicone layer may be utilised in step (c). For example, the foam may be applied by hand, robotically or as a foam in place process directly on the composition or silicone layer. It may also be applied using pre-compression to assist in maintaining the foam in place after application.

If a foreign body, such as a nail, passes through the structure of the tire, the composition serving as self-sealing silicone layer is subjected to several stresses. In reaction to these stresses, and thanks to its advantageous deformability and elasticity properties, said composition creates an impermeable contact zone around the body. It does not matter whether the contour or the profile of said body is uniform or regular, the flexibility of the self-sealing composition enables it to be introduced into openings of very small size. This interaction between the self-sealing silicone layer and the foreign body seals the zone affected by said body.

In the event of the foreign body being removed, whether accidentally or intentionally, a puncture hole remains, this being liable to create a relatively large leak, depending on its size. The self-sealing silicone layer, exposed to the hydrostatic pressure, is sufficiently soft and deformable to seal off, by being deformed, the puncture hole, preventing the inflation gas from leaking. In particular in the case of a tire, it has been shown that the flexibility of the self-sealing composition enables the forces of the surrounding walls to be withstood without any problems, even during phases in which the loaded tire deforms when running/rolling.

As will be seen from the following examples it was found that the self-sealing silicone layer was a very good adhesive for adhering the foam to the inner surface of the tire and that the adhesion of the foam to the self-sealing silicone layer did not appear to have any significantly detrimental effects on the function of the self-sealing silicone layer for the tire.

The silicone self-sealing composition as described above, upon cure, is particularly well suited to use as a self-sealing silicone layer as a puncture-resistant layer in a tire for a vehicles of the passenger type, SUVs (Sport Utility Vehicles), two-wheel vehicles (especially bicycles and motorcycles), aircraft, or industrial vehicles chosen from vans, "heavy" vehicles, i.e., underground trains, buses, road transport vehicles (lorries, tractors, trailers), off-road vehicles, such as agricultural or civil engineering machines, and other transport or handling vehicles.

EXAMPLES

Comparative Examples Taken from WO2018024857
All viscosity measurements were made Brookfield cone plate viscometer RV DIII using the most appropriate cone plate at 23° C. unless otherwise indicated.

For the benefit of the examples the following commercially available tires were purchased and utilized for the comparative examples:
Bridgestone® Turanza ER300 205/55/16 91H,
Continental® Conti Premium Contact 5 205/55/16 91W,
Goodyear® Efficient Grip 205/55/16 91H,
Michelin® Energy Saver 205/55/16 91V, and
Pirelli® Cinturato P7 205/55/16 91V.
Preparation of Comparative Base A 73.01 g of Nanocyl® NC 7000 carbon nanotubes, 3544.2 g of OH terminated polydimethylsiloxane exhibiting a viscosity of ca 50,000 mPa·s and a number average molecular weight (Mn) of 63,000 g/mol and 382.8 g of Trimethoxysilyl terminated polydimethylsiloxane exhibiting a viscosity of ca 56,000 mPa·s and an number average molecular weight (Mn) of 62,000 g/mol were added in a Neulinger 5 liter mixer. They were initially mixed for 2 minutes using a planetary mixer at 50 rpm, then for a further 15 minutes using the planetary mixer at 50 rpm and the disk at 700 rpm and finally for a further 30 minutes using the planetary mixer at 100 rpm and the disk at 700 rpm. The resulting base product was then unloaded into a pail.

Preparation of Base B 1500 g of Evonik Printex A carbon black, 8825 g of OH terminated polydimethylsiloxane exhibiting a viscosity of ca 50,000 mPa·s and an number average molecular weight (Mn) of 63,000 g/mol and 973 g of Trimethoxysilyl terminated polydimethylsiloxane exhibiting a viscosity of ca 56,000 mPa·s and an number average molecular weight (Mn) of 62,000 g/mol were added in a 20 liter pail and was mixed 60 minutes with a Collomix Biax pail mixer.

Preparation of the Mixtures

Comparative Example 1

24.87 g of Trimethoxysilyl terminated polydimethylsiloxane having a viscosity of ca 56,000 mPa·s and an number average molecular weight (Mn) of 62,000 g/mol and 0.133 g of tetra n-butyl titanate were mixed together with a dental mixer at 2300 rpm for 30 seconds. 250 g of base A was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Comparative Example 2

28.85 g of Trimethoxysilyl terminated polydimethylsiloxane having a viscosity of ca 56,000 mPa·s and an number average molecular weight (Mn) of 62,000 g/mol and 0.155 g of tetra n-butyl titanate were mixed together with a dental mixer at 2300 rpm for 30 seconds. 290 g of base 2 was introduced into a plastic container. The pre-mixture of trimethoxysilyl terminated polydimethylsiloxane (viscosity, 56,000 mPa·s) and tetra n-butyl titanate was added into the container and mixed for four periods of 30 seconds in a speed-mixer at 2300 rpm.

Tabulated details of the compositions of Comparative examples 1 and 2 tested are provided in Table 1. The results of the test on the tires as run below are depicted in Tables 2a-c.

TABLE 1

| Compositions | | |
|---|---|---|
| Weight parts | Comp. Ex. 1 | Comp. Ex. 2 |
| Part 1-Base | | |
| OH terminated polydimethylsiloxane (viscosity ca 50,000 mPa · s) | 100 | 100 |
| Nanocyl ® NC 7000 carbon nanotubes | 2.06 | |
| Printex ® A carbon black | | 17 |
| Trimethoxysilyl terminated polydimethylsiloxane (viscosity ca 56,000 mPa · s) | 10.8 | 10.8 |
| Part 2-Crosslinker and catalyst | | |
| Trimethoxysilyl terminated polydimethylsiloxane (viscosity ca 56,000 mPa · s) | 11.2 | 11.2 |
| tetra n-butyl titanate | 0.06 | 0.06 |
| SiOH/SiOR mol content | 1.46 | 1.37 |
| Xlinker content (mmol/100 g) | 0.29 | 0.26 |

Evaluation of Hardness and Storage Modulus

A TA XT plus texture analyzer was used to monitor the hardness of the cured elastomer. The probe used is a polycarbonate cylinder terminated by a spherical end. The diameter of the probe and sphere is ½ inch (1.27 cm). A return to start program was used. The pre-test speed is 5 mm/s and the trigger force is 0.1 g. The test speed is 1 mm/s. the probe is inserted to a distance of 5 mm in the product and then removed to a distance where no significant force is measured. The maximum positive and negative force is measured and reported here. A higher positive force is representative of a harder elastomer. A higher negative force is representative of a tackier elastomer.

Evaluation of Sealing Efficiency

Holes of 3 mm diameter were cut on the rolling band of the tires with the help of a press and a cutting cylinder. The resulting product of Comparative examples 1 and 2 were respectively filled into 310 ml cartridges and applied onto the inside of the tires and smoothed with a ruler at the designed thickness.

The products of Comparative examples 1 and 2 were applied at the desired thickness to cover 3 holes in the tire without filling them. After 7 days of cure at 23° C. and 50% relative humidity the tires were mounted on wheels and pressurized at 1 bar (0.1 MPa). Nails of 5 mm diameter were pushed in the 3 mm holes to a distance of 40 mm inside the tire. The pressure was then increased to 2.7 bars (0.27 MPa) and the holes were removed from the tire.

In the following hours and days the leaking holes were filled with string repair plugs without cement, until no more leaks were observed, using optionally water to track leaks. The tires were kept for two weeks after repair. Results after 14 days without a loss of more than 0.1 bar (0.01 MPa) are reported in tables 2a and b. A 3/3 means that no leakage was observed on any of the 3 holes. 0/3 means that all three holes had to be repaired since they leaked.

TABLE 2a

Tire (5 mm thick coating)-Tightness of punctures after 2 weeks at 2.7 bars (0.27 MPa)

| | Comp. Ex. 1 | Comp. Ex. 2 |
|---|---|---|
| Bridgestone ® Turanza ER300 205/55/16 91H | 3/3 | 3/3 |
| Continental ® Conti Premium Contact 5 205/55/16 91W | 3/3 | 3/3 |
| Goodyear ® Efficient Grip 205/55/16 91H | 3/3 | 3/3 |
| Michelin ® Energy Saver 205/55/16 91V | 3/3 | 3/3 |
| Pirelli ® Cinturato P7 205/55/16 91V | 3/3 | 3/3 |

TABLE 2b

Tire (3 mm thick coating)-Tightness of punctures after 2 weeks at 2.7 bars (0.27 MPa)

| | Comp. Ex. 1 | Comp. Ex. 2 |
|---|---|---|
| Bridgestone ® Turanza ER300 205/55/16 91H | 2/3 | 3/3 |
| Continental ® Conti Premium Contact 5 205/55/16 91W | 3/3 | 3/3 |
| Goodyear ® Efficient Grip 205/55/16 91H | 3/3 | 3/3 |
| Michelin ® Energy Saver 205/55/16 91V | 3/3 | 0/3 |
| Pirelli ® Cinturato P7 205/55/16 91V | 2/3 | 3/3 |

Comp. Examples 1 and 2 is showing excellent results for tightness, this shows that an appropriate crosslink density is required to obtain a product that will seal tires.

TABLE 2c

| Texture Analyser results and Absolute Tackiness | | |
| --- | --- | --- |
| | Comp. Ex. 1 | Comp. Ex. 2 |
| F+ (g) | 210 | 217 |
| F− (g) | 100 | 93 |
| Absolute Tackiness | 0.48 | 0.45 |

Texture analyzer results of the examples indicate that a compromise in hardness and tackiness must be achieved for an appropriate performance in the tire. Comp. Example 1 and 2 exhibit an appropriate balance of hardness and tackiness to close the gap caused by the nail without exhibiting creep, however they have a low absolute tackiness and as such may suffer from tackiness issues with some foreign bodies and self-sealing punctures. However, it will be seen that each of the compositions used above had an absolute tackiness of less than (<) 0.5 which is significantly less than those used herein.

Process for making Example 1

Part A 80 kg of the following mixture was prepared. About 100 parts by weight of a silanol terminated polydimethylsiloxane having a number average molecular weight of about 60,000 g/mol and a viscosity of about 50,000 mPa·s at 23° C. was mixed with about 3 parts by weight of trimethoxysilyl terminated polydimethylsiloxane having a number average molecular weight of about 63,000 g/mol with a viscosity of 56,000 mPa·s at 23° C. and 17 part by weight of carbon black (Printex A) in a Drais mixer for about 15 minutes. The material was packaged in pails and then mixed 2×60 min in a collomix mixer.

Part B 18 kg of the following mixture was prepared. About 100 parts by weight of trimethoxysilyl terminated polydimethylsiloxane having an average molecular weight in number of about 63,000 and a viscosity of 56,000 mPa·s at 23° C. was mixed with 0.53 parts by weight of tetra n-butoxy titanium in a collomix.

Part A and Part B were mixed at a ratio of 10:1 in weight using a Rheinhardt dispensing equipment and applied on tires.

A Bridgestone® Ecopia 205/55 R16 91V was pre-cut with 10 holes of about 3 mm diameter in the rim of the rolling band of the tire. It was coated inside with a silicone sealant on the rolling band at a thickness of about 5 mm in average without filling the precut holes. On about half of the circumference of the tire a closed cell polyurethane foam was applied on the uncured silicone sealant.

After 28 days of cure, the foam cannot be removed from the tire. There is excellent adhesion of the foam on the tire. The only way to remove the foam is to crack the silicone layer.

After mounting the tire on a wheel, 20 nails of about 5 mm diameter were inserted in the tire inflated at about 2.7 bars. 10 nails in the sealant layer only and 10 nails in the sealant layer where the foam was applied. Half of each series of nail have been inserted in the precut holes and half of the series in the tire at various other locations in the rolling band.

No leakage has been observed at that point. Then all 20 nails have been removed for the tire. It was inspected for gas leakage over a period of 2 weeks. When leakage was observed for a period of more than a few minutes, the hole was repaired and then inspected again and left for 2 weeks after the last repair. The following results have been obtained:

| | Number of holes not repaired/number of nails inserted | |
| --- | --- | --- |
| | Precut holes of 3 mm | Other locations |
| Silicone sealant | 4/5 | 5/5 |
| Silicone sealant + foam | 3/5 | 4/5 |

The results from the above table are showing that the self-sealing silicone layer is closing most of the punctures with the nails whether or not the foam is present. Hence, using the self-sealing silicone layer as an adhesive for the sound-absorbing layer does surprisingly not negatively affect the function of said layer to self-seal the tire.

What is claimed is:

1. A self-sealing pneumatic tire comprising:
    an inner surface and an outer surface having a profiled tread;
    a self-sealing silicone layer applied on the inner surface; and
    a sound-absorbing layer adhesively attached to the inner surface by way of the self-sealing silicone layer;
    wherein the self-sealing silicone layer is applied before the sound-absorbing layer is adhered thereto;
    wherein the self-sealing silicone layer is cured from a silicone self-sealing composition, the silicone self-sealing composition comprising:
        (i) at least one condensation curable silyl terminated polymer having at least two hydroxyl functional groups per molecule;
        (ii) a cross-linker selected from the group consisting of:
    silanes having at least two hydrolysable groups, optionally at least three hydrolysable groups per molecule group;
    silyl functional molecules having at least two silyl groups, each silyl group containing at least two hydrolysable groups, optionally at least three hydrolysable groups; and combinations thereof;
        (iii) a condensation catalyst selected from the group consisting of titanates, zirconates, and combinations thereof; and
        (iv) reinforcing and/or non-reinforcing filler(s);
    wherein components (iii) and (iv) are not stored together prior to use;
    wherein the molar ratio of total silicon bonded-hydroxyl groups to total hydrolysable groups is between 0.5:1 and 2:1 using a silane cross-linker, or 0.5:1 to 10:1 using a silyl functional molecule cross-linker;
    wherein the titanates and zirconates comprise M-OR functions, where M is titanium or zirconium and R is an alkyl group or chelate group; and
    wherein the molar ratio of M-OR functions of the catalyst (iii) to the sum of moisture present in the filler(s) (iv), as determined in accordance with ISO 787-2:1981, and total silicon bonded hydroxyl groups is between 0.01:1 and 0.6:1: and
    wherein component (ii) is present in the composition in an amount of from 1.0 wt. % to 10.0 wt. %; and
    wherein upon cure, the composition provides a self-adhering silicone-based product having an absolute tackiness of>1.025, where absolute tackiness=−[tackiness strength (F−)]/[hardness strength (F+)].

2. The self-sealing pneumatic tire in accordance with claim 1, wherein the sound absorbing layer is a sound-absorbing foam.

3. The self-sealing pneumatic tire in accordance with claim 1, wherein the sound-absorbing layer is a closed cell foam, an open cell foam, or a combination of both, and is optionally viscoelastic.

4. The self-sealing pneumatic tire in accordance with claim 1, wherein the sound-absorbing layer is selected from the group consisting of a polyurethane foam, a polyester foam, a polyolefin foam, a silicone foam, a polyether foam, and combinations thereof.

5. The self-sealing pneumatic tire in accordance with claim 1, wherein the molar ratio of total silicon bonded hydroxyl groups to total hydrolysable groups in the silicone self-sealing composition is between 1:1 and 2:1.

6. The self-sealing pneumatic tire in accordance with claim 1, wherein prior to application, the silicone self-sealing composition is stored in two-parts, i) a base part comprising polymer (i) and filler (iv), and ii) a curing part comprising cross-linker (ii) and catalyst (iii).

7. The self-sealing pneumatic tire in accordance with claim 1, wherein the silicone self-sealing composition comprises an organopolysiloxane based polymer (i) having not less than two silicon-bonded hydroxyl or hydrolysable groups per molecule and a viscosity of from 30,000 mPa·s to 200,000 mPa·s at 23° C.

8. The self-sealing pneumatic tire in accordance with claim 1, wherein polymer (i) of the silicone self-sealing composition additionally comprises polydiorganosiloxanes which have one silanol containing terminal group and one unreactive terminal group.

9. The self-sealing pneumatic tire in accordance with claim 1, wherein cross-linker (ii) of the silicone self-sealing composition additionally comprises silyl functional molecules having at least two silyl groups, where at least one silyl group contains one hydrolysable group.

10. The self-sealing pneumatic tire in accordance with claim 1, wherein the self-sealing silicone layer has a thickness of greater than 0.3 mm.

11. The self-sealing pneumatic tire in accordance with claim 1, wherein the self-sealing silicone layer has a thickness of between 0.5 mm and 10 mm.

12. The self-sealing pneumatic tire in accordance with claim 1, wherein filler(s) (iv) is selected from the group consisting of fumed silicas, precipitated silicas, calcium carbonate, carbon black, hollow glass beads, carbon nanotubes, and combinations thereof.

13. The self-sealing pneumatic tire in accordance with claim 12, wherein filler(s) (iv) comprises multiwall carbon nanotubes and/or carbon black.

14. A process for preparing a self-sealing pneumatic tire, the method comprising:
(a) providing a pneumatic tire comprising an outer surface having a profiled tread and an inner surface;
(b) applying a self-sealing silicone layer on the inner surface; and
(c) applying a sound-absorbing layer to the inner surface by adhesion to the self-sealing silicone layer;
wherein the self-sealing silicone layer is cured from a silicone self-sealing composition, the silicone self-sealing composition comprising:
(i) at least one condensation curable silyl terminated polymer having at least two hydroxyl functional groups per molecule;
(ii) a cross-linker selected from the group consisting of:
silanes having at least two hydrolysable groups, optionally at least three hydrolysable groups per molecule group;
silyl functional molecules having at least two silyl groups, each silyl group containing at least two hydrolysable groups, optionally at least three hydrolysable groups; and combinations thereof;
(iii) a condensation catalyst selected from the group consisting of titanates, zirconates, and combinations thereof; and
(iv) reinforcing and/or non-reinforcing filler(s);
wherein components (iii) and (iv) are not stored together prior to use;
wherein the molar ratio of total silicon bonded-hydroxyl groups to total hydrolysable groups is between 0.5:1 and 2:1 using a silane cross-linker, or 0.5:1 to 10:1 using a silyl functional molecule cross-linker;
wherein the titanates and zirconates comprise M-OR functions, where M is titanium or zirconium and R is an alkyl group or chelate group; and
wherein the molar ratio of M-OR functions of the catalyst (iii) to the sum of moisture present in the filler(s) (iv), as determined in accordance with ISO 787-2:1981, and total silicon bonded hydroxyl groups is between 0.01:1 and 0.6:1; and
wherein component (ii) is present in the composition in an amount of from 1.0 wt. % to 10.0 wt. %; and
wherein upon cure, the composition provides a self-adhering silicone-based product having an absolute tackiness of >1.025, where absolute tackiness=−[tackiness strength (F−)]/[hardness strength (F+)].

15. The process for preparing a self-sealing pneumatic tire in accordance with claim 14, wherein the tire is vulcanized prior to application of the silicone self-sealing composition on to the inner surface.

16. The process for preparing a self-sealing pneumatic tire in accordance with claim 14, wherein the self-sealing silicone layer is cured prior to application of the sound-absorbing layer.

* * * * *